United States Patent
Franz et al.

(10) Patent No.: US 9,140,373 B2
(45) Date of Patent: Sep. 22, 2015

(54) THERMALLY ACTUATED VALVE

(71) Applicant: HEWLETT-PACKARD DEVELOPMENT COMPANY, L.P., Houston, TX (US)

(72) Inventors: John P. Franz, Houston, TX (US); Michael Lawrence Sabotta, Houston, TX (US); Tahir Cader, Liberty Lake, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 375 days.

(21) Appl. No.: 13/724,085

(22) Filed: Dec. 21, 2012

(65) Prior Publication Data
US 2014/0174545 A1 Jun. 26, 2014

(51) Int. Cl.
*F16K 17/38* (2006.01)
*F16K 31/02* (2006.01)

(52) U.S. Cl.
CPC ............... *F16K 17/38* (2013.01); *F16K 31/025* (2013.01); *Y10T 137/0324* (2015.04); *Y10T 137/7737* (2015.04)

(58) Field of Classification Search
CPC .......... G05D 23/275; G05D 23/27526; G05D 23/30; F16K 17/38; F16K 31/025; Y10T 137/0324; Y10T 137/7737
USPC ............. 236/93 R, 99 R, 99 K, 99 J; 137/468
See application file for complete search history.

(56) References Cited

U.S. PATENT DOCUMENTS

| | | | |
|---|---|---|---|
| 3,822,563 A | 7/1974 | Orth | |
| 4,878,512 A | 11/1989 | Pirkel | |
| 5,427,132 A | 6/1995 | Fenner, Jr. | |
| 5,445,318 A | 8/1995 | Michel | |
| 6,644,619 B2 | 11/2003 | Friesenhahn et al. | |
| 2002/0047050 A1* | 4/2002 | Leu et al. | 236/12.16 |
| 2002/0070367 A1* | 6/2002 | Friesenhahn et al. | 251/11 |

FOREIGN PATENT DOCUMENTS

JP 55047074 B 11/1980

OTHER PUBLICATIONS

MixTemp 180™ Mix Valve ; http://media.wattswater.com/MixTemp180Submittal.pdf>; Copyright © 2005 Watts Radiant, Inc. MixTemp 180 Submittal LIT#MIX180SUB0805 Effective Aug. 9, 2005.

* cited by examiner

*Primary Examiner* — Marc Norman
(74) *Attorney, Agent, or Firm* — Hewlett-Packard Patent Development

(57) ABSTRACT

A thermally actuated valve is provided herein. The thermally actuated valve includes a valve fitting, a valve body, and a movement control mechanism. The valve fitting includes an active member to selectively activate based on an input. The valve body includes a passive wax member that moves between a passive contraction state and a passive expansion state based on a passive temperature. The movement control mechanism is disposed between the valve fitting and the valve body. The movement control mechanism controls movement of the valve body between an open state and a closed state based on movement of at least one of the active member and the passive wax member.

19 Claims, 7 Drawing Sheets

THERMALLY ACTUATED VALVE

BACKGROUND

Reactive thermally actuated valves passively respond to temperatures without the use of an electrical connection. For example, the thermally actuated valve contains a temperature reactive wax member that reacts to the temperature surrounding the wax member. The temperature that the wax member reacts to is determined in advance.

BRIEF DESCRIPTION OF THE DRAWINGS

Non-limiting examples of the present disclosure are described in the following description, read with reference to the figures attached hereto and do not limit the scope of the claims. In the figures, identical and similar structures, elements or parts thereof that appear in more than one figure are generally labeled with the same or similar references in the figures in which they appear. Dimensions of components and features illustrated in the figures are chosen primarily for convenience and clarity of presentation and are not necessarily to scale. Referring to the attached figures:

DETAILED DESCRIPTION

In the following detailed description, reference is made to the accompanying drawings which form a part hereof, and in which is depicted by way of illustration specific examples in which the present disclosure may be practiced. It is to be understood that other examples may be utilized and structural or logical changes may be made without departing from the scope of the present disclosure.

Reactive thermally actuated valves contain a temperature reactive wax member that reacts to the temperature surrounding the wax member. Thermally actuated valves are passive and controlled by the temperature of the wax member, as determined by the environment surrounding the wax member. Failure of the valve may require replacement of the valve to preserve the functionality of a system using the valve.

In examples, a thermally actuated valve is provided. The thermally actuated valve includes a valve fitting, a valve body, and a movement control mechanism. The valve fitting includes an active member to selectively activate the thermally actuated valve based on an input. The valve body includes a passive wax member that moves between a passive contraction state and a passive expansion state based on a passive temperature. The movement control mechanism is disposed between the valve fitting and the valve body. The movement control mechanism controls movement of the valve body between an open state and a closed state based on movement of at least one of the active member and the passive wax member.

Figure 1:
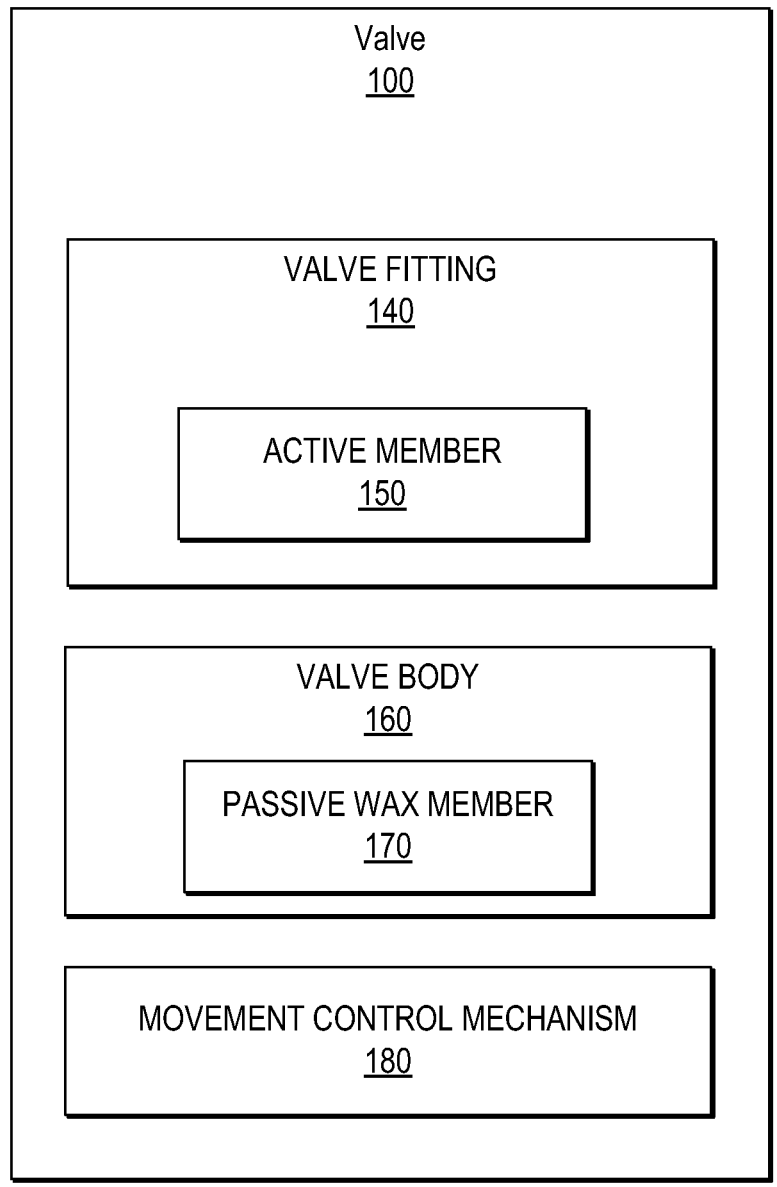
FIG. 1 illustrates a block diagram of a thermally actuated valve according to an example.

FIG. 1 illustrates a block diagram of a thermally actuated valve 100 according to an example. The thermally actuated valve 100 includes a valve fitting 140, a valve body 160, and a movement control mechanism 180. The valve fitting 140 includes an active member 150 that selectively activates movement of the thermally actuated valve. For example, the active member 150 may include an active wax member, a servo motor, a solenoid, or a nitinol wire. The movement of the active member 150 is based on an in input, such as a power source and/or a heat source that provides an active temperature.

The valve body 160 includes a passive wax member 170 that moves between a passive contraction state and a passive expansion state. The movement of the passive wax member 170 is based on a passive temperature, such as a valve body temperature. The movement control mechanism 180 is disposed between the valve fitting 140 and the valve body 160. The movement control mechanism 180 is fixed to the valve fitting 140 and controls movement of the valve body 160 between an open state and a closed state.

Figure 2A:
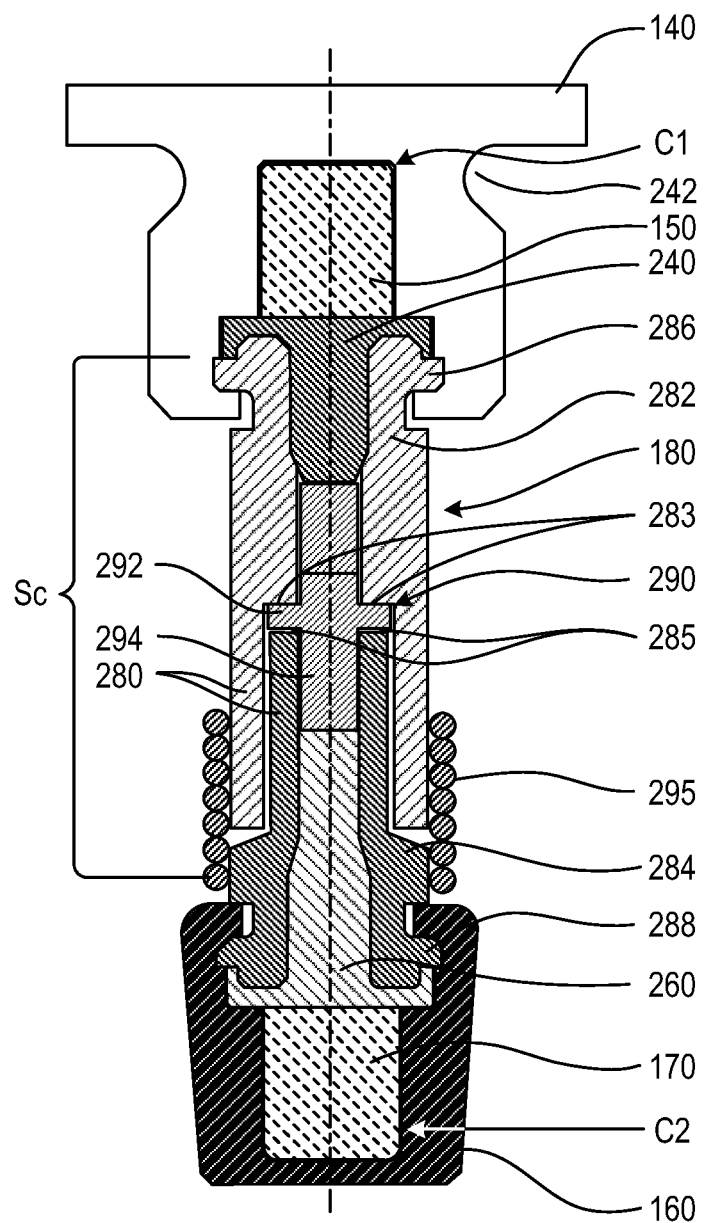
FIGS. 2A-C illustrate cross-sectional views of the valve of FIG. 1 according to examples.
Figure 2B:
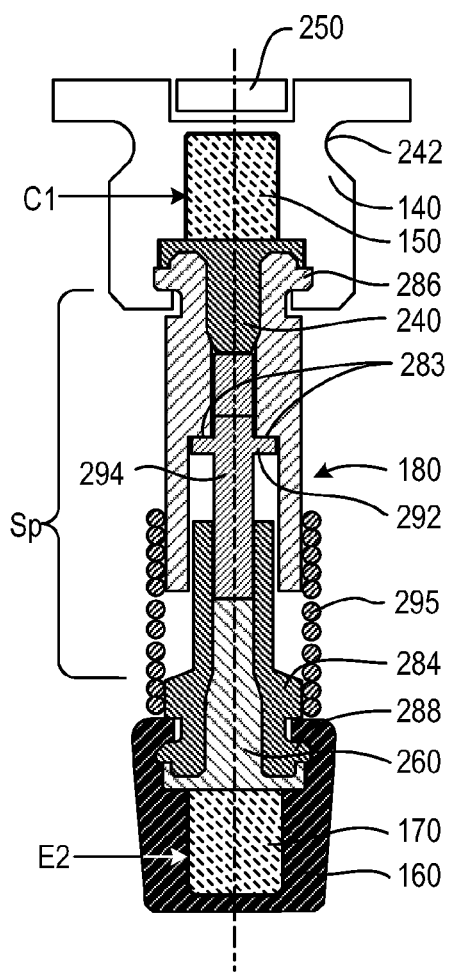
Figure 2C:
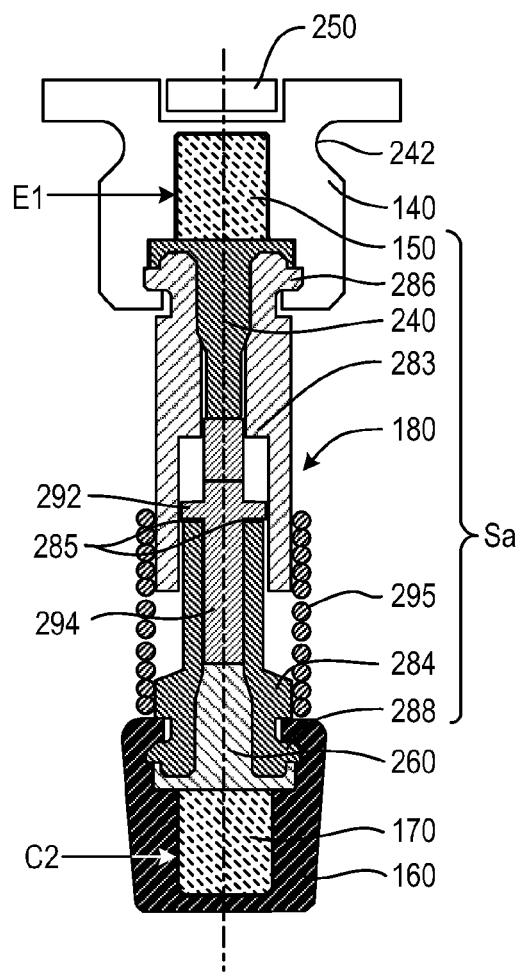

FIGS. 2A-C illustrate cross-sectional views of the valve 100 of FIG. 1 according to examples. As illustrated in FIG. 1, the thermally actuated valve 100 includes a valve fitting 140, a valve body 160, and a movement control mechanism 180. The valve fitting 140 may be used to secure the valve 100 to a system using, for example, a fitting engagement member 242. The fitting engagement member 242 may include a threaded portion or other engagement member to securely attach the valve 100 to a wall or other member.

Referring to FIGS. 2A-2C, the valve fitting 140 includes an active member 150, such as an active wax member 150 that selectively moves between an active contraction state and an active expansion state. FIGS. 2A-2C illustrate the active wax member 150 that selectively moves between an active contraction state C1 and an active expansion state E1. In the active contraction state C1, the active wax member 150 remains in one portion of the valve fitting 140; however, in the active expansion state E1, the active wax member 150 expands into the active opening 240 or deforms the active opening 240. The active expansion state E1, provides pressure to the movement control mechanism 180, which moves the body 294 of the rod 290. The movement of the active wax member 150 is based on an active temperature provided by a heat source 250 illustrated in FIGS. 2B-2C. The active wax member 150 is connected to the heat source 250 or to a portion of the valve fitting 140 formed of a first thermally conductive material 252. When the active wax member 150 is connected to the heat source 250, the heat transfers to the active wax member 150 and increases the temperature of the active wax member 150 connected to the portion of the valve fitting 140.

The valve fitting 140 is formed of conductive material that receives heat from the heat source and transfers heat to the active wax member 150. For example, the active wax member 150 is encased by the first thermally conductive material 252, e.g., copper, such that the heat is transferred from the heat source 250 to the active wax member 150 via the first thermally conductive material 252.

The active temperature is determined by a heat source and/or an input. The input is used to actively activate the heat source 250 based on a predefined setting or an override function that uses the input to increase or decrease the active temperature and use the heat source 250 to set or maintain that active temperature. For example, a temperature change in the environment surrounding the valve 100 may be sensed by a sensor and the temperature change causes the activation of the heat source 250. Alternatively or in addition, a user may manually provide input and activate the heat source 250. For example, to increase a flow of fluid based on temperature or other factors, such as monitoring of the pressure or flow of the fluid and adjusting the valve 100 accordingly.

The valve body 160 includes a passive wax member 170 that moves between a passive contraction state C2 and a passive expansion state E2. In the passive contraction state C2, the passive wax member 170 remains in one portion of the valve fitting 140; however, in the passive expansion state E2, the passive wax member 170 expands into the passive opening 260 and provides pressure to the movement control mechanism 180, which moves the body 294 of the rod 290. The movement of the passive wax member 170 is based on a passive temperature, such as a valve body temperature. The passive wax member 170 is connected to or encased by a conductive material to receive heat and transfer the heat to the passive wax member 170 and cause a reaction. For example, the valve body 160 is formed of a second thermally conductive material 272 that maintains a temperature of a surrounding environment. In other words, the temperature of the valve body 160 (i.e., the valve body temperature) is approximately the same on an outer surface of the valve body 160 that contacts the surrounding environment and an inner surface of the valve body 160 that contacts the passive wax member 170.

The movement control mechanism 180 is disposed between the valve fitting 140 and the valve body 160. The movement control mechanism 180 controls movement of the valve body 160 between an open state and a closed state. The movement of at least one of the active wax member 150 and the passive wax member 170 causes the movement control mechanism 180 to move or transition between open and closed states. The movement control mechanism 180 includes a sleeve 280, a rod 290, and a resilient member 295.

The sleeve 280 includes a first sleeve portion 282 and a second sleeve portion 284. The first sleeve portion 282 engages with the valve fitting 140 at a first sleeve fastener 286 and is fixed thereto. The second sleeve portion 284 engages with the valve body 160 at a second sleeve fastener 288 and is fixed thereto. The rod 290 is formed between the first sleeve portion 282 and the second sleeve portion 284. The rod 290 is moveable within the sleeve 280. The rod 290 includes a protrusion 292 extending from the body 294 of the rod 290. The protrusion 292 selectively engages 283, 285 with the first sleeve portion 282 and the second sleeve portion 284. The body 294 includes, for example, a cylinder or a piston. The resilient member 295 has a return force to hold the movement control mechanism 180 in the closed state. The return force also returns the movement control mechanism 180 to the closed state when, for example, no opposing force is applied by the protrusion 292 to separate the first sleeve portion 282 and the second sleeve portion 284. For example, the movement control mechanism 180 controls movement of the valve body 160 between a closed state as illustrated in FIG. 2A and two open states, i.e., a passive open state as illustrated in FIG. 2B and an active open state as illustrated in FIG. 2C.

Referring to FIG. 2A, the closed state $S_c$ is illustrated. In the closed state $S_c$ the active wax member 150 and the passive wax member 170 are in a contraction state, i.e., an active contraction state C1 and a passive contraction state C2, respectively. The movement control mechanism 180 is compressed, such that, the protrusion 292 engages with both the first sleeve portion 282 and the second sleeve portion 284, illustrated as state $S_c$. Moreover, the first sleeve portion 282 and the second sleeve portion 284 may overlap one another. For example, the first sleeve portion 282 may form an outer sleeve and the second sleeve portion 284 may form an inner sleeve or vice versa.

In the open states as illustrated in FIGS. 2B-2C, the movement control mechanism 180 is expanded. In the open states, the rod 290 engages with one of the sleeve portions selected from the first sleeve portion 282 and the second sleeve portion 284 depending on whether the active wax member 150 or the passive wax member 170 is in an expansion state.

FIG. 2B illustrates the passive open state $S_p$. In the passive open state $S_p$, the passive wax member 170 reacts to the passive temperature or temperature of the valve body by expanding and contracting, i.e., the passive wax member 170 moves between a passive expansion state E2 and a passive contraction state C2 based on the valve body temperature. Expansion of the passive wax member 170 occurs when the valve body temperature increases. Expansion provides a pressure that causes the rod 290 to move opposite or away from the passive wax member 170 until the protrusion 292 engages 283 with the first sleeve portion 282 and provide separation between the first sleeve portion 282 and the second sleeve portion 284, illustrated by state $S_p$. In state $S_p$, the resilient member 295, such as a spring, expands as the first and second sleeves 282, 284 separate.

From the passive open state $S_p$, the movement control mechanism 180 may move back to the closed state $S_c$, as illustrated in FIG. 2A. Contraction of the passive wax member 170 occurs when the valve body temperature decreases. The contraction of the passive wax member 170 removes the pressure that pushes the rod 290 opposite the passive wax member 170, which causes the rod 290 to move towards the passive wax member 170. As the rod 290 moves back towards the passive wax member 170, the protrusion 292 engages 283, 285 with both the first sleeve portion 282 and the second sleeve portion 284 as illustrated in state $S_c$. The resilient member 295, such as a spring, holds the movement control mechanism 180 in the closed state $S_c$.

The active open state $S_a$ is illustrated in FIG. 2C. In the active open state $S_a$, the active wax member 150 is selectively activated based on an input and a reaction to heat or energy from the heat source 250. The active temperature is determined by the heat source 250 and the input. The active temperature selectively controls the expanding and contracting of the active wax member 150. The heat source 250 increases the temperature of the active wax member 150 by increasing the temperature of a portion of the valve fitting 140 that contacts the active wax member 150.

Activation of the heat source 250 causes the opening or expansion of the valve 100. For example, a temperature sensor may be connected to the heat source and a change in temperature corresponding to the thermally actuated valve's position activates the opening of the valve 100. Alternatively, other sensors or triggers, such as thermal or pressure changes, may be used to manually or automatically activate the expansion of the active wax member 150 to open the valve 100.

The increase in temperature of the active wax member 150 causes the protrusion 292 to engage 285 with the second sleeve portion 284 and provide separation between the first sleeve portion 282 and the second sleeve portion 284. For example, expansion provides pressure; the pressure is transferred to the active opening 240, which becomes deformed or transformed from the pressure. The pressure then and causes the rod 290 to move opposite or away from the active wax member 150 until the protrusion 292 engages with the second sleeve portion 284 and provide separation between the first sleeve portion 282 and the second sleeve portion 284, illustrated by state $S_a$. In state $S_a$, the resilient member 295, such as a spring, expands as the first and second sleeves 282, 284 separate.

From the active open state $S_a$, the movement control mechanism 180 may move back to the closed state $S_c$, as illustrated in FIG. 2A. Contraction of the active wax member 150 occurs when the heat source stops increasing a temperature of the active wax member 150, for example, by decreasing the temperature of the heat source. The contraction of the active wax member 150 removes the pressure that pushes the rod 290 opposite the passive wax member 170, which causes the rod 290 to move towards the active wax member 150. As the rod 290 moves back towards the active wax member 150, the protrusion 292 engages 283, 285 with both the first sleeve portion 282 and the second sleeve portion 284 as illustrated in state $S_c$. The resilient member 295, such as a spring, holds the movement control mechanism 180 in the closed state $S_c$.

Figure 3:
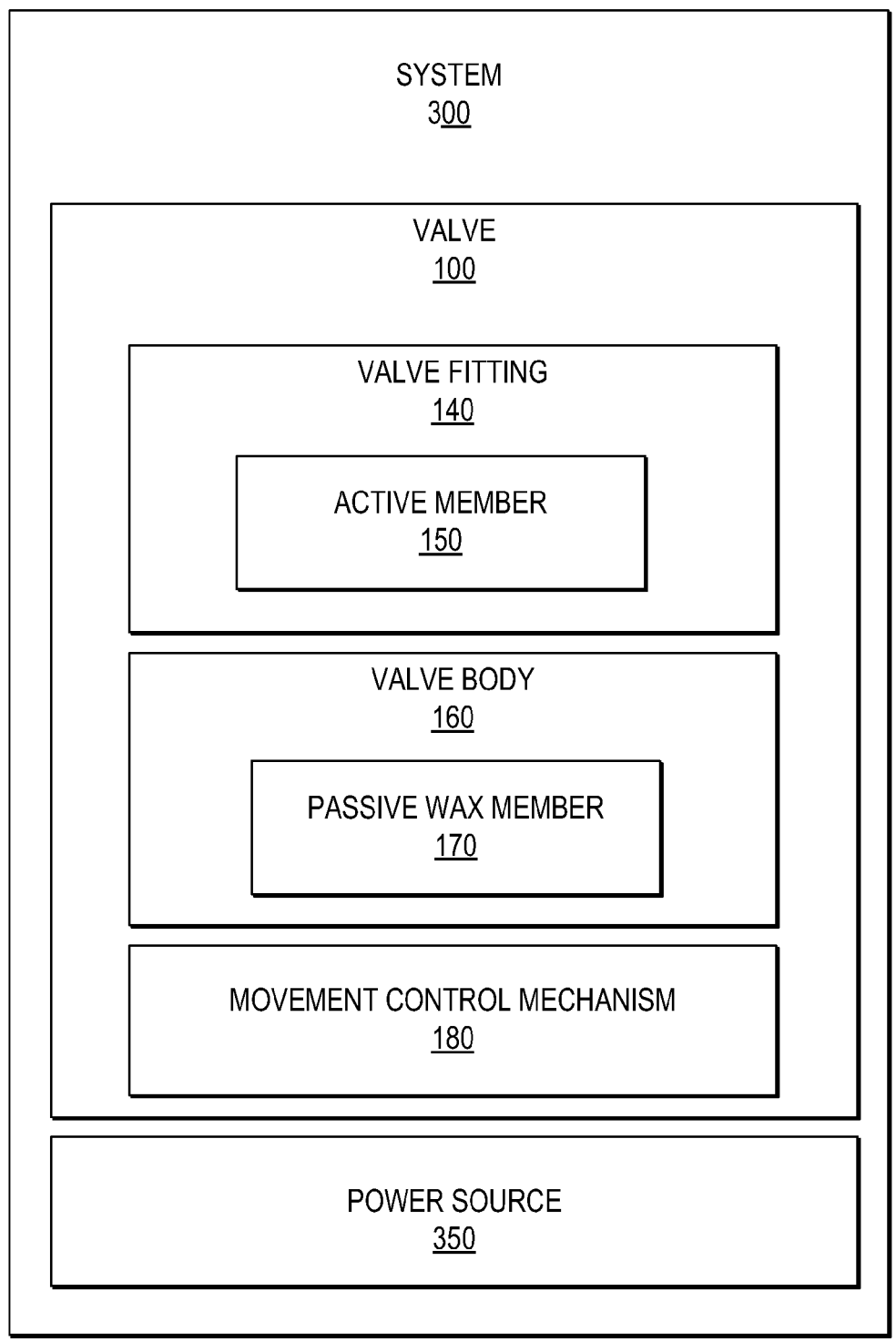
FIG. 3 illustrates a block diagram of a system usable with the thermally actuated valve of FIG. 1 according to an example.

FIG. 3 illustrates a block diagram of a system 300 usable with the thermally actuated valve 100 of FIG. 1 according to an example. The system 300 includes a thermally actuated valve 100, and a power source 350. The heat source 250 is connected to the thermally actuated valve 100 to provide or maintain the active temperature.

The thermally actuated valve 100 includes a valve fitting 140, a valve body 160, and a movement control mechanism 180. The valve fitting 140 includes an active member 150 that selectively activates movement of the thermally actuated valve. For example, the active member 150 includes an active wax member that moves between an active contraction state C1 and an active expansion state E1. The movement of the active member 150 is based on an input, such as an active temperature provided by the heat source. The valve body 160 includes a passive wax member 170 that moves between a passive contraction state C2 and a passive expansion state E2. The movement of the passive wax member 170 is based on a passive temperature, such as a valve body temperature.

The movement control mechanism 180 is disposed between the valve fitting 140 and the valve body 160. The movement control mechanism 180 controls movement of the valve body 160 between an open state and a closed state. The expansion and contraction, of at least one of the active member 150 and the passive wax member 170 controls the motion or reaction of the movement control mechanism 180.

The power source 350 is connected to the active member 150 to actively initiate the active member 150 based on an input. For example, the power source 350 may be a battery pack or power supply connected to the heat source 250 via wires 410, where the heat source 250 activates the active member 150, as illustrated in FIG. 4.

Figure 4:
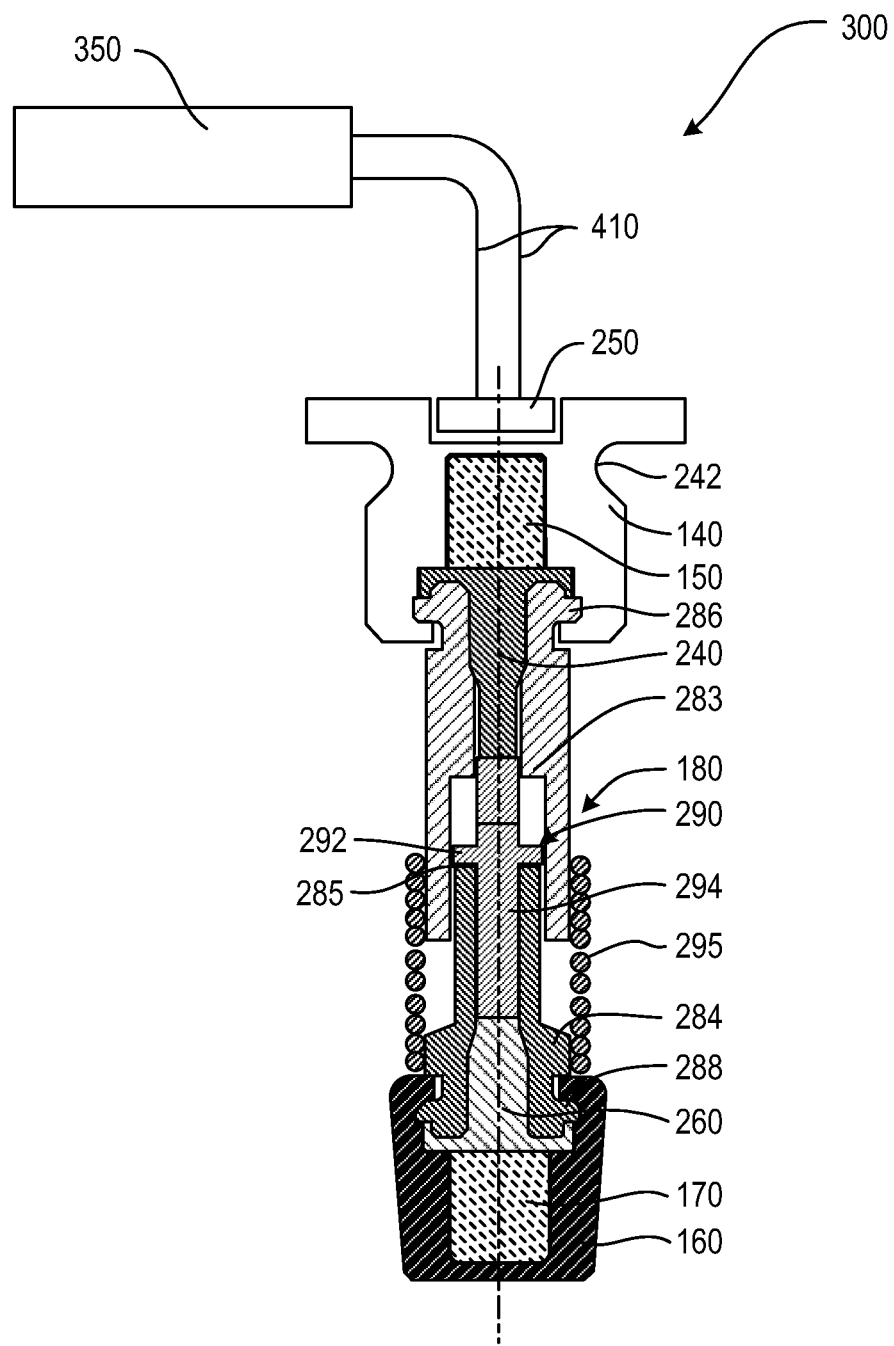
FIGS. 4-5 illustrate the system of FIG. 3 according to examples.
Figure 5:
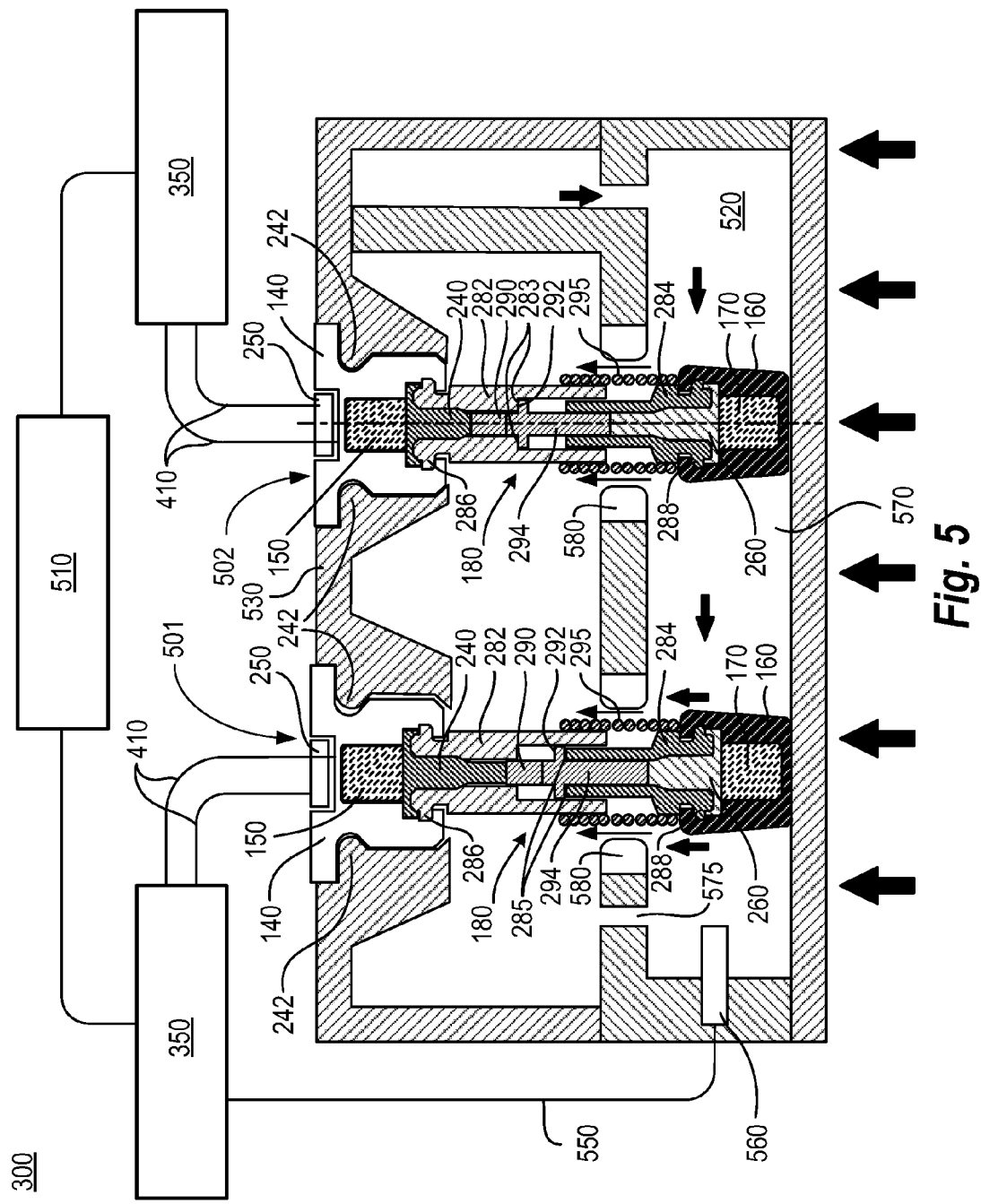

FIGS. 4-5 illustrate the system 300 of FIG. 3 according to examples. FIG. 4 illustrates a cross-sectional view of the system 300 of FIG. 3 according to an example. The valve fitting 140 includes an active wax member 150 that selectively moves between an active contraction state C1 and an active expansion state E1. In the active contraction state C1, the active wax member 150 remains in one portion of the valve fitting 140; however, in the active expansion state E1, the active wax member 150 expands into or deforms the active opening 240. The pressure from the active wax member 150 transfers to the active opening 240, which provides pressure to the movement control mechanism 180. The pressure causes movement of the rod 290, i.e., movement of the body 294 of the rod 290.

The movement of the active wax member 150 is based on an active temperature provided by a heat source 250. For example, the heat source 250 may be a resistor that contacts the valve fitting 140 and/or the active wax member 150 of the valve 100. The heat source 250 selectively provides the active temperature using, for example, an input. The power source 350 is connected to the heat source 250 to actively initiate the heat source 250 based on the input. For example, the power source 350 may be a battery pack or power supply connected to the heat source 250 via wires 410, as illustrated in FIG. 4.

The active wax member 150 is connected to the heat source 250 or to a portion of the valve fitting 140 formed of a first thermally conductive material 252. When the active wax member 150 is connected to the heat source 250, the heat transfers to the active wax member 150 and increases the temperature of the active wax member 150 connected to a portion of the valve fitting 140. The valve fitting 140 is formed of conductive material that receives heat from the heat source and transfers heat to the active wax member 150. For example, the active wax member 150 is encased by the first thermally conductive material 252, e.g., copper, such that the heat is transferred from the heat source 250 to the active wax member 150 via the first thermally conductive material 252.

The active temperature is determined by a heat source 250 and/or an input. The input is used to actively activate the heat source 250 based on a predefined setting or an override function that uses the input to increase or decrease the active temperature and use the heat source 250 to set or maintain the active temperature. For example, a temperature change in the environment surrounding the valve 100 may be sensed by a sensor and the temperature change causes the activation of the heat source 250. Alternatively or in addition, a user may manually provide input and activate the heat source 250 to increase a flow of fluid based on temperature or other factors, such as monitoring of pressure or flow within the system 300.

The valve body 160 includes a passive wax member 170 that moves between a passive contraction state C2 and a passive expansion state E2. In the passive contraction state C2, the passive wax member 170 remains in one portion of the valve fitting 140; however, in the passive expansion state E2, the passive wax member 170 expands into or deforms the passive opening 260 using pressure from the passive wax member 170. The passive opening 260 transfers the pressure from the passive wax member 170 to the movement control mechanism 180, such as the body 294 of the rod 290. The movement of the passive wax member 170 is based on a passive temperature, such as a valve body temperature. The passive wax member 170 is connected to or encased by a thermally conductive material 272 to receive heat and transfer the heat to the passive wax member 170 and cause a reaction. For example, the valve body 160 is formed of the second thermally conductive material 272, such as copper, that maintains a temperature of a surrounding environment. In other words, the temperature of the valve body 160 (i.e., the valve body temperature) is approximately the same on an outer surface of the valve body 160 that contacts the surrounding environment and an inner surface of the valve body 160 that contacts the passive wax member 170.

The movement control mechanism 180 is disposed between the valve fitting 140 and the valve body 160. The movement control mechanism 180 controls movement of the valve body 160 between an open state and a closed state. The movement of at least one of the active wax member 150 and the passive wax member 170 controls the motion or reaction of movement control mechanism 180. The movement control mechanism 180 includes a sleeve 280, a rod 290, and a resilient member 295.

The sleeve 280 includes a first sleeve portion 282 and a second sleeve portion 284. The first sleeve portion 282 engages with the valve fitting 140 at a first sleeve fastener 286 and is fixed thereto. The second sleeve portion 284 engages with the valve body 160 at a second sleeve fastener 288 and is fixed thereto. The rod 290 is formed between the first sleeve portion 282 and the second sleeve portion 284. The rod 290 includes a protrusion 292 extending from the body 294 of the rod 290. The protrusion 292 selectively engages with the first sleeve portion 282 and the second sleeve portion 284. The body 294 includes, for example, a cylinder or piston. The resilient member 295 has a return force to hold the movement control mechanism 180 in the closed state $S_c$. The return force also returns the movement control mechanism 180 to the closed state $S_c$ when, for example, no opposing force is applied by the protrusion 292 to separate the first sleeve portion 282 and the second sleeve portion 284. For example, the movement control mechanism 180 controls movement of the valve body 160 between a closed state $S_c$ as illustrated in FIG. 4 and two open states, i.e., a passive open state and an active open state as illustrated in FIG. 5.

Referring to FIG. 4, the closed state $S_c$ is illustrated. In the closed state $S_c$, the active wax member 150 and the passive wax member 170 are in a contraction state, i.e., an active contraction state C1 and a passive contraction state C2, respectively. The movement control mechanism 180 is compressed, such that, the protrusion 292 engages with both the first sleeve portion 282 and the second sleeve portion 284. Moreover, the first sleeve portion 282 and the second sleeve portion 284 may overlap one another. For example, the first sleeve portion 282 may form an outer sleeve and the second sleeve portion 284 may form an inner sleeve or vice versa. The resilient member 295, such as a spring, holds the movement control mechanism 180 in the closed state $S_c$.

FIG. 5 illustrates the system 300 of FIG. 3 with the thermally actuated valve installed. As illustrated in FIG. 5, the valve fitting 140 is secured to a wall 530 using a fitting engagement member 242. The heat source 250 is illustrated as embedded in the valve fitting 140. The heat source 250 is connected to the power source 350 via a pair of wires 410. The power source 350 is also illustrated to include a connection 550, such as a wire or wireless connections, to a sensor 560 in the channel 570. The channel 570 is illustrated to carry a fluid 520. For example, the sensor 560 may detect temperature, fluid levels, pressure, or flow within the channel 570.

The valve body 160 is located within or along a channel 570. The channel 570 includes a seal member 580, such as an O-ring, that is capable of forming a fluid tight seal with the valve body 160 when aligned. The channel 570 may also include a small aperture 575 to allow for continual release of a small amount of fluid 520, such as to stabilize the system 300. As the movement control mechanism 180 moves between the open and closed states, the valve body moves into and out of alignment with the seal member 580. In the open states as illustrated in FIG. 5, the movement control mechanism 180 is expanded. In the open states, the rod 290 engages 283, 285 with one of the sleeve portions selected from the first sleeve portion 282 and the second sleeve portion 284 depending on whether the active wax member 150 or the passive wax member 170 is in an expansion state.

As illustrated in FIG. 5, a plurality of thermally actuated valves 100 may be used. The valves 100 may be configured to be controlled actively and/or passively and each valve may be separately or independently controlled by one or more control units 510. Each control unit 510 is connected to at least one power source 350 and may activate only one of the valves 100 or more than one of the valves 100 depending on the configuration and/or environmental factors, such as an override function or a reaction to a sensor, a pressure change, or a thermal change. For example, a first valve 501 may be controlled actively, while a second valve 502 is controlled passively, or vice versa. Moreover, both valves may be controlled the same way, i.e., passively or actively.

The active open state $S_a$ as illustrated in a first valve 501 of FIG. 5. In the active open state $S_a$, the active wax member 150 is selectively activated based on an input and a reaction to heat or energy from the heat source 250. The active temperature is determined by the heat source 250 and the input. The active temperature selectively controls the expanding and contracting of the active wax member 150. The heat source 250 increases the temperature of the active wax member 150 by increasing the temperature of a portion of the valve fitting 140 that contacts the active wax member 150.

Activation of the heat source 250 causes the opening or expansion of the valve 100. For example, a temperature sensor 560 may be connected to the power source 350 and/or the heat source 250, i.e., via the power source 350. A change in temperature corresponding to the thermally actuated valves position activates the opening of the valve 100. Alternatively, other sensors or triggers, such as thermal or pressure changes, may be used to manually or automatically activate the expansion of the active wax member 150 to open the valve 100.

The increase in temperature of the active wax member 150 causes the protrusion 292 to engage 285 with the second sleeve portion 284 and provide separation between the first sleeve portion 282 and the second sleeve portion 284. For example, expansion provides pressure that causes the rod 290 to move opposite or away from the active wax member 150 until the protrusion 292 engages with the second sleeve portion 284 and provide separation between the first sleeve portion 282 and the second sleeve portion 284, illustrated by state $S_a$. In state $S_a$, the resilient member 295, such as a spring, expands as the first and second sleeves 282, 284 separate.

From the active open state $S_a$, the movement control mechanism 180 may move back to the closed state $S_c$, as illustrated in FIG. 4. Contraction of the active wax member 150 occurs when the heat source 250 stops increasing a temperature of the active wax member 150, for example, by decreasing the temperature of the heat source 250. The contraction of the active wax member 150 removes the pressure that pushes the rod 290 opposite the active wax member 170, which causes the rod 290 to move towards the active wax member 150. As the rod 290 moves back towards the active wax member 150, the protrusion 292 engages 283, 285 with both the first sleeve portion 282 and the second sleeve portion 284 as illustrated in state $S_c$. The resilient member 295, such as a spring, holds the movement control mechanism 180 in the closed state $S_c$.

FIG. 5 illustrates the second valve 502 in the passive open state $S_p$. In the passive open state $S_p$, the passive wax member 170 reacts to the passive temperature or temperature of the valve body by expanding and contracting, i.e., the passive wax member 170 moves between a passive expansion state E2 and a passive contraction state C2 based on the valve body temperature. Expansion of the passive wax member 170 occurs when the valve body temperature increases. Expansion provides a pressure that causes the rod 290 to move opposite or away from the passive wax member 170 until the protrusion 292 engages 283 with the first sleeve portion 282 and provide separation between the first sleeve portion 282 and the second sleeve portion 284, illustrated by state $S_p$. In state $S_p$, the resilient member 295, such as a spring, expands as the first and second sleeves 282, 284 separate.

From the passive open state $S_p$, the movement control mechanism 180 may move back to the closed state $S_c$, as illustrated in FIG. 4. Contraction of the passive wax member 170 occurs when the valve body temperature decreases. The contraction of the passive wax member 170 removes the pressure that pushes the rod 290 opposite the passive wax member 170, which causes the rod 290 to move towards the passive wax member 170. As the rod 290 moves back towards the passive wax member 170, the protrusion 292 engages 283, 285 with both the first sleeve portion 282 and the second sleeve portion 284 as illustrated in state $S_c$. The resilient member 295 holds the movement control mechanism 180 in the closed state $S_c$.

Figure 6:
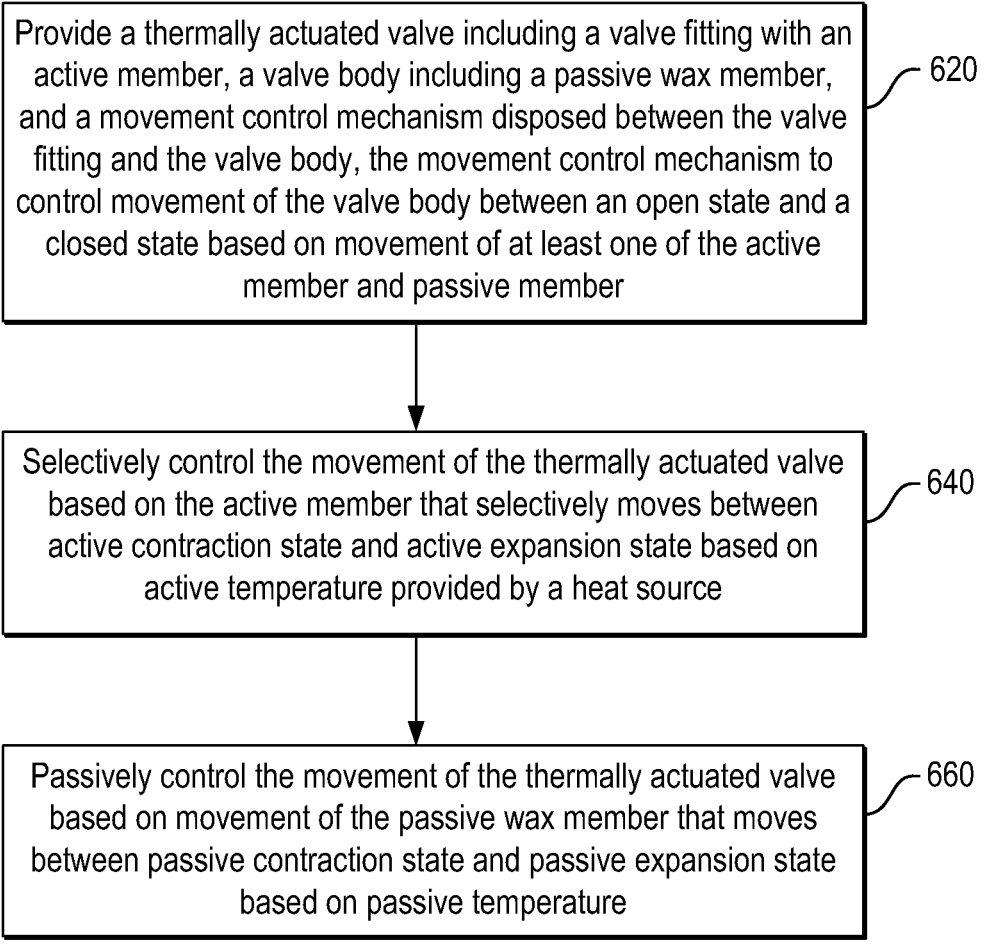
FIG. 6 illustrates a flow chart of a method to control a movement of a thermally actuated valve according to an example.

FIG. 6 illustrates a flow chart 600 of a method to control a movement of a thermally actuated valve according to an example. The method provides the thermally actuated valve in block 620. The thermally actuated valve includes a valve fitting with an active member, a valve body including a passive wax member, and a movement control mechanism disposed between the valve fitting and the valve body. The movement control mechanism controls movement of the valve body between an open state and a closed state based on movement of at least one of the active member and passive wax member.

Referring to block 640, the active member selectively controls the movement of the thermally actuated valve. The active member selectively moves between an active contraction state and an active expansion state based on an active temperature provided by a heat source. Referring to block 660, the passive wax member passively controls the movement of the thermally actuated valve based on movement of the passive wax member. The passive wax member moves between a passive contraction state and a passive expansion state based on a passive temperature.

The method may control at least one thermally actuated valve and specifically may control a plurality of thermally actuated valves. At least one of the plurality of thermally actuated valves is actively controlled using the heat source and the input to control the active temperature, and another of the plurality of the thermally actuated valves is passively controlled based on the passive temperature. For example, a first thermally actuated valve and a second thermally actuated valve is provided. At least one of the first thermally actuated valve and the second thermally actuated valve controlled by a control unit that connects to a power source. The power source is connected to the heat source. The control unit receives an input and in response transmits a signal to the power source, which forwards another signal to the heat source to set the active temperature, i.e., increase, decrease, or maintain the active temperature to control the thermally actuated valve or valves being actively controlled.

Although the flow diagram of FIG. 6 illustrates specific orders of execution, the order of execution may differ from that which is illustrated. For example, the order of execution of the blocks may be scrambled relative to the order shown. Also, the blocks shown in succession may be executed concurrently or with partial concurrence. All such variations are within the scope of the present invention.

The present disclosure has been described using non-limiting detailed descriptions of examples thereof and is not intended to limit the scope of the present disclosure. It should be understood that features and/or operations described with respect to one example may be used with other examples and that not all examples of the present disclosure have all of the features and/or operations illustrated in a particular figure or described with respect to one of the examples. Variations of examples described will occur to persons of the art. Furthermore, the terms "comprise," "include," "have" and their conjugates, shall mean, when used in the present disclosure and/or claims, "including but not necessarily limited to."

It is noted that some of the above described examples may include structure, acts or details of structures and acts that may not be essential to the present disclosure and are intended to be exemplary. Structure and acts described herein are replaceable by equivalents, which perform the same function, even if the structure or acts are different, as known in the art. Therefore, the scope of the present disclosure is limited only by the elements and limitations as used in the claims.

What is claimed is:

1. A thermally actuated valve comprising:
   a valve fitting including an active member to selectively activate movement of the thermally actuated valve based on an input;
   a valve body including a passive wax member to move between a passive contraction state and a passive expansion state based on a passive temperature; and
   a movement control mechanism disposed between the valve fitting and the valve body, wherein the movement control mechanism includes a rod between a first sleeve portion and a second sleeve portion, the rod includes a protrusion extending therefrom to engage with the first sleeve portion and the second sleeve portion, and wherein the movement control mechanism controls movement of the valve body between an open state and a closed state based on movement of at least one of the active member and passive wax member.

2. The valve of claim 1, wherein the passive temperature corresponds to a temperature of the valve body.

3. The valve of claim 1, wherein the active member comprises an active wax member that moves between an active contraction state and an active expansion state based on a heat source selectively providing an active temperature.

4. The valve of claim 1, wherein the movement control mechanism includes:
   a sleeve comprising the first sleeve portion and the second sleeve portion,
   the first sleeve portion engages with the valve fitting, and
   the second sleeve portion engages with the valve body.

5. The valve of claim 4, wherein in the closed state the active wax member corresponds to an active contraction state and the passive wax member corresponds to a passive contraction state such that the protrusion engages with both the first sleeve portion and the second sleeve portion.

6. The valve of claim 4, wherein in the open state at least one of the active wax member corresponds to the active expansion state and the passive wax member corresponds to the passive expansion state, such that the rod that engages with one of the sleeve portions selected from the first sleeve portion and the second sleeve portion,
   in the active open state, as the active wax member expands, the rod engages with the second sleeve portion and forms a separation between the first sleeve portion and the second sleeve portion,
   in the passive open state, as the passive wax member expands, the rod engages with the first sleeve and forms a separation between the first sleeve portion and the second sleeve portion.

7. The valve of claim 1, further comprising a resilient member with a return force to:
   hold the movement control mechanism in the closed state; and
   return the movement control mechanism to the closed state.

8. The valve of claim 1, wherein the first sleeve portion and the second sleeve portion overlap in the closed state.

9. A system comprising:
   at least one thermally actuated valve including:
      a valve fitting including an active member to selectively activate movement of the thermally actuated valve;
      a valve body including a passive wax member to move between a passive contraction state and a passive expansion state based on a passive temperature;

a movement control mechanism disposed between the valve fitting and the valve body, wherein the movement control mechanism includes a rod between a first sleeve portion and a second sleeve portion, the rod includes a protrusion extending therefrom to engage with the first sleeve portion and the second sleeve portion, and wherein the movement control mechanism controls movement of the valve body between an open state and a closed state based on movement of at least one of the active member and passive wax member; and a power source connected to the active member, the power source to activate the active member based on an input.

10. The system of claim 9, further comprising:
a sleeve comprising the first sleeve portion and the second sleeve portion,
the first sleeve portion engages with the valve fitting, and the second sleeve portion engages with the valve body.

11. The system of claim 10, further comprising a resilient member with a return force to:
hold the movement control mechanism in the closed state; and
return the movement control mechanism to the closed state when an opposing force is applied by the protrusion to separate the first sleeve portion and the second sleeve portion.

12. The system of claim 10, wherein the closed state corresponds to engagement of the protrusion with both the first sleeve portion and the second sleeve portion, wherein the first sleeve portion and the second sleeve portion overlap.

13. The system of claim 9, wherein the active member comprises an active wax member that moves between an active contraction state and an active expansion state, the power source connected to a heat source, the heat source to selectively provide an active temperature, the power source to activate the heat source to the active temperature based on the input.

14. The system of claim 13, wherein in the open state at least one of the active wax member corresponds to the active expansion state and the passive wax member corresponds to the passive expansion state, such that the rod that engages with one of the sleeve portions selected from the first sleeve portion and the second sleeve portion, in the active open state, as the active wax member expands, the rod engages with the second sleeve portion and forms a separation between the first sleeve portion and the second sleeve portion, in the passive open state, as the passive wax member expands, the rod engages with the first sleeve and forms a separation between the first sleeve portion and the second sleeve portion.

15. The system of claim 9, wherein the at least one thermally actuated valve comprises a first thermally actuated valve and a second thermally actuated valve, at least one of the first thermally actuated valve and the second thermally actuated valve controlled by the power source.

16. The system of claim 15, wherein at least one of the first thermally actuated valve and the second thermally actuated valve controlled by the passive temperature.

17. The system of claim 9, wherein the passive temperature corresponds to a temperature of the valve body.

18. A method to control a movement of at least one thermally actuated valve, the method comprising:
providing the at least one thermally actuated valve including a valve fitting with an active member, a valve body including a passive wax member, and a movement control mechanism disposed between the valve fitting and the valve body, wherein the movement control mechanism includes a rod between a first sleeve portion and a second sleeve portion, the rod includes a protrusion extending therefrom to engage with the first sleeve portion and the second sleeve portion, and wherein the movement control mechanism controls movement of the valve body between an open state and a closed state based on movement of at least one of the active member and passive wax member;

selectively controlling the movement of one of the at least one thermally actuated valves using a heat source and an input, the movement based on the active member that selectively moves between an active contraction state and an active expansion state based on an active temperature provided by the heat source; and passively controlling the movement of the one of the at least one thermally actuated valve based on movement of the passive wax member that moves between a passive contraction state and a passive expansion state based on a passive temperature.

19. The method of claim 18, further comprising controlling a plurality of thermally actuated valves, one of the plurality of thermally actuated valves actively controlled using the active member, the heat source, and the input, another of the plurality of the thermally actuated valves passively controlled using the passive wax member.

* * * * *